Nov. 22, 1955　　　　T. A. CARTER, JR　　　　2,724,784
MAGNETIC POWER TRANSMISSION
Filed Sept. 1, 1951　　　　　　　　　　　　2 Sheets—Sheet 1
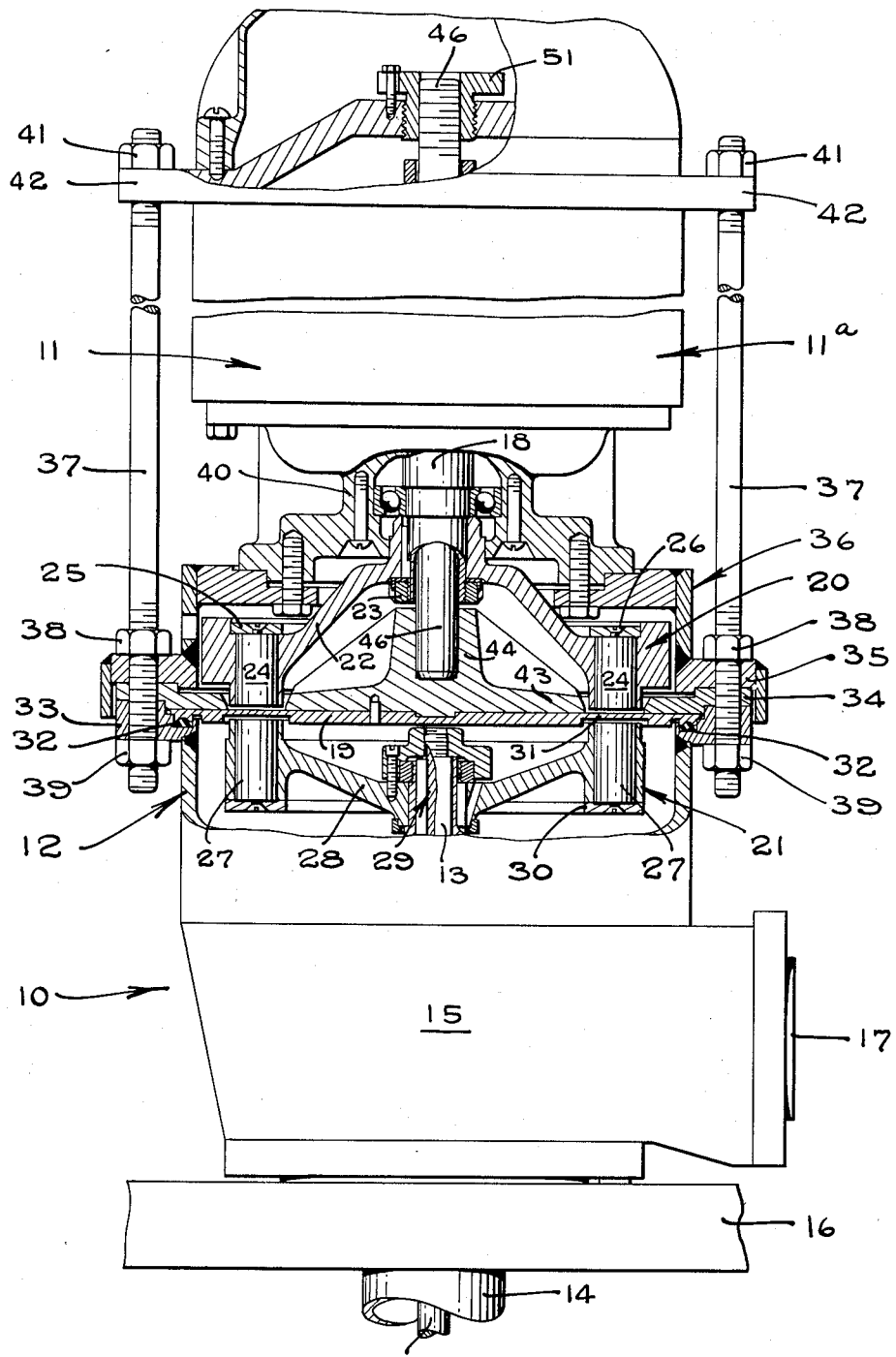
FIG_1
INVENTOR
THOMAS A. CARTER JR.
BY Hans G. Hoffmeister
ATTORNEY Nov. 22, 1955     T. A. CARTER, JR     2,724,784
MAGNETIC POWER TRANSMISSION
Filed Sept. 1, 1951     2 Sheets-Sheet 2
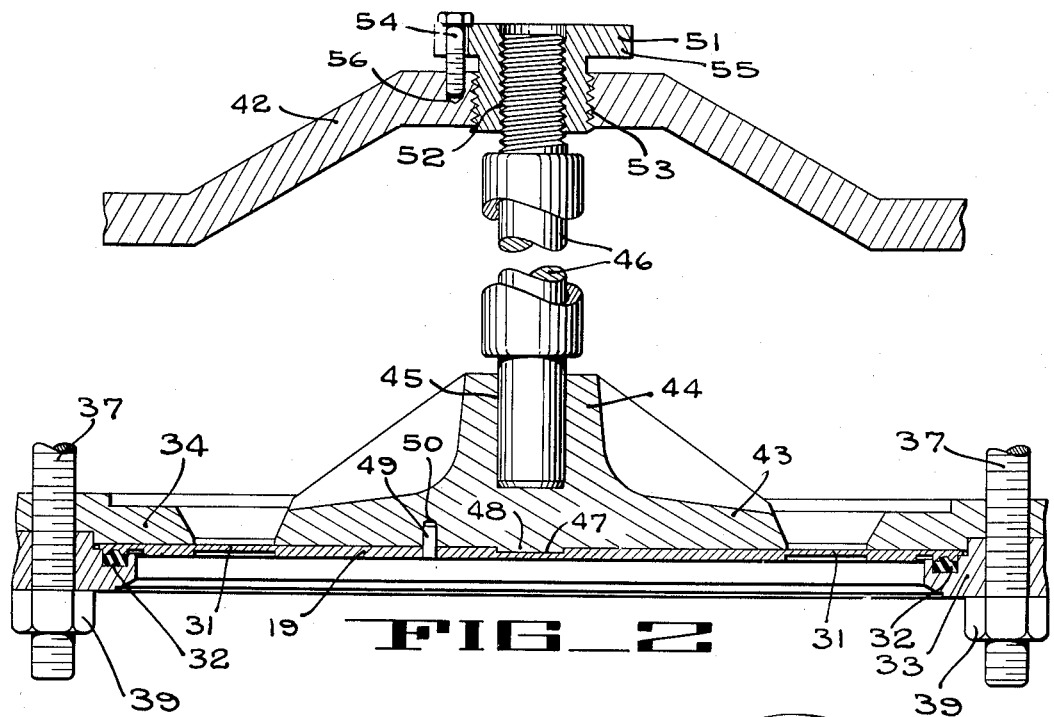
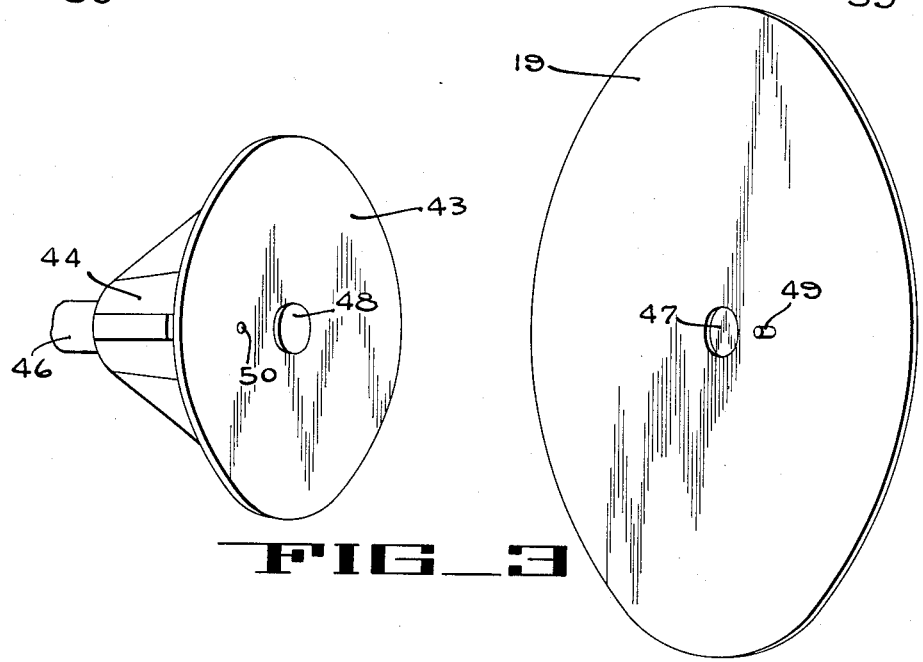
INVENTOR
THOMAS A. CARTER JR.
BY Hans G. Hoffmeister
ATTORNEY

United States Patent Office 2,724,784
Patented Nov. 22, 1955

2,724,784

MAGNETIC POWER TRANSMISSION

Thomas A. Carter, Jr., Temple City, Calif., assignor to Food Machinery and Chemical Corporation, San Jose, Calif., a corporation of Delaware Application September 1, 1951, Serial No. 244,840

8 Claims. (Cl. 310—104)

The present invention relates to a power transmission arrangement and more particularly to a magnetic power transmission arrangement for applying power to fluid handling devices such as rotary pumps and the like.

The conventional rotary pump drive comprises a rotating shaft which extends through an aperture in the stationary casing or housing of the pump. To prevent fluid leakage, some form of packing must be provided between the shaft and casing. Unless such packing is tightly compressed, leakage will occur and will be of greater magnitude in direct relation to increased fluid pressures developed within the pump. However, if in an attempt to eliminate such leakage, the packing is very tightly compressed, excessive frictional losses result and a sizable decrease of power is incurred.

As a consequence, in those instances wherein leakage or power loss has proved of serious detriment, it has become an alternate practice to employ a magnetic power transmission arrangement which eliminates the described shaft and packing construction. Such an arrangement may comprise a plurality of driving and driven magnets supported for rotation in corresponding ring-like configurations on opposite sides of a stationary member which is impervious to fluid flow. Since a direct mechanical connection is eliminated by such a magnetic coupling, no rotary shaft need pass through the impervious sealing member.

The force between magnets varies inversely as the square of the distance therebetween. Accordingly, it is desirable that the described sealing member be in the form of a thin diaphragm so that the distance between the respective driving and driven magnets may be minimized and the force therebetween maintained at a practical maximum. However, since the principal need for such a magnetic drive arrangement is in those installations where high pressures are developed which are inefficiently handled by the conventional shaft-driven pump as pointed out hereinbefore, the described thin diaphragm must be supported in a manner enabling it to withstand such pressures.

It is accordingly an object of the present invention to provide an improved magnetic drive arrangement for fluid handling devices which will enable the handling of high pressure fluids.

It is another object to provide an arrangement adapted to support a thin diaphragm, as employed in magnetic drive mechanisms of the described character, in a manner enabling it to withstand high fluid pressures.

It is a further object to provide a diaphragm support of the type referred to, which is mounted exteriorly of the pump so that the precise structural arrangement within the pump is not modified, limited nor affected thereby.

These and other objects of the invention will become apparent from the following description and the accompanying drawings wherein:

Fig. 1 is a fragmentary elevational view, partly in section, of a deep-well pump installation embodying my invention.

Fig. 2 is an enlarged sectional view of a portion of the device shown in Fig. 1.

Fig. 3 is an exploded perspective view of the diaphragm and the support member therefore as employed in power transmission arrangement incorporated in the pump installation illustrated in Fig. 1.

With particular reference to Fig. 1, a deep-well rotary pump 10 is illustrated as energized by a motor 11 through an interposed magnetic power transmission arrangement which is generally indicated by the numeral 12.

The deep-well pump 10 includes an operating shaft 13 coaxially disposed within a vertically extending tubular casing 14. A pump impeller (not shown) is mounted at the lower end of the pump shaft 13 to deliver liquid upwardly through the casing 14, which forms the outlet conduit of the pump. The casing 14 terminates within a cylindrical housing 15 which rests on a base plate 16 and is provided with a lateral discharge opening 17 for liquid delivered by the pump 10 through the described casing into the housing.

To operate the pump shaft 13, the motor 11 is suitably supported above the cylindrical housing 15 with its shaft 18 in vertical axial alignment with the pump shaft 13. Power is transmitted from the motor shaft 18 to the pump shaft 13 without permitting fluid leakage from the pump by providing a circular diaphragm 19 which covers the open upper end of the cylindrical housing 15 and which is interposed between magnetic coupling elements 20 and 21 supported respectively from the axially opposed ends of the motor and pump shafts.

The driving magnetic coupling element 20 comprises an arched and centrally apertured disc 22 which is secured to the lower threaded end of the motor shaft 18 by the lock nut 23. A number of bar magnets 24 are received within circumferentially spaced holes provided in the disc 22 which extend substantially parallel to the axis of the motor shaft 18. The bar magnets are in contact with an annular plate 25 which rests on the disc 22 and is connected to the upper ends of the bar magnets by screws 26. This annular plate 25 is preferably constructed of a ferrous material so that a flux path between adjacent magnets 24 will be provided.

The lower ends of the bar magnets 24 are closely adjacent the upper surface of the aforementioned diaphragm 19 and upon rotation of the motor shaft 18, describe an annular orbit thereabove. A similar annular orbit is described immediately beneath the diaphragm 19 within the cylindrical housing 15 by a number of bar magnets 27 which form the hereinbefore mentioned driven magnetic coupling element 21. These driven magnets 27 are similar to the drive magnets 24 and are similarly supported on a disc 28 connected, as shown at 29, to the pump shaft 13 for rotation therewith. As in the case of the drive magnets 24, the driven magnets 27 rest upon and are secured to an annular plate 30 of ferrous material which provides a flux path between adjacent magnets.

From the foregoing it will be apparent that upon energization of the motor 11, torque will be transmitted from the motor shaft 18 to the pump shaft 13 through the driving and driven magnetic coupling elements 20 and 21 supported on those shafts, respectively. To provide a high degree of coupling between the coupling elements 20, 21, the diaphragm 19 interposed therebetween is formed by a relatively thin circular sheet of stainless steel. To maximize the coupling, the gap between the driving and driven magnets may be further reduced by providing an annular recess 31 on the lower side of the diaphragm 19 in registration with the orbit described by the driven magnets 27.

When the pump is in operation, as above described, the interior of the cylindrical housing 15 is subject to the fluid pressure developed thereby. Consequently, a gasket 32 is provided on a flange or lip 33 arranged on the upper end of the housing 15 to sealingly seat the diaphragm 19. A ring 34 overlies the periphery of the diaphragm, and seated on the ring 34 is the flange portion 35 of an annular guard member 36 which surrounds the magnetic drive element 20. A plurality of threaded bars 37 extend through the lip 33 of the housing 15, the ring 34 and the flange 35 so that respective pairs of nuts 38, 39 on said bars 37 may connect the three members and simultaneously clamp the diaphragm 19 in sealing engagement with the gasket 32.

A member 40 somewhat resembling an hourglass is secured to the upper end of the guard member 36 and surrounds the motor shaft 18. Said member is bolted to the frame 11a of the motor 11 to support the motor in the desired axially aligned position relative to the pump 10. To additionally tie the motor to the pump, the previously described bars 37 are extended so that their upper ends may be secured by nuts 41 to a circular plate 42 which forms a portion of the motor frame 11a.

Since, as has been heretofore explained, the magnetic drive arrangement is of particular value when high fluid pressures are developed, means are provided in accordance with the invention to support the central section of the thin diaphragm 19 to enable successful application of the arrangement. The improved means for this purpose provided by the present invention comprises a circular plate 43 of a circumferennce slightly less than the annular orbit described by the rotating magnets. This plate is formed with an integral axial boss 44 having a bore 45 which tightly receives an elongated bar 46. The motor shaft 18 is made hollow so that said bar 46 may pass upwardly therethrough for adjustable connection with the frame plate 42 at the upper end of the motor whereby the circular plate 43 is supported in a stationary position in engagement with the upper surface of the stationary diaphragm 19. Since the periphery of the diaphragm 19 is clamped against the gasket 32 and supported against the fluid pressure within the housing 15 by the ring 34 only the annular section of the diaphragm adjacent the magnets 24, 27 remains unsupported against fluid pressures, and since said unsupported section is relatively small, high pressures may be sustained.

To maintain properly centered alignment of the circular supporting plate 43 with the diaphragm 19, a central indentation 47 on the latter receives a matching protrusion 48 on the former. If desired, an eccentrically positioned pin 49 on the diaphragm 19 may be provided to enter a corresponding aperture 50 in the plate 43 to overcome a possible tendency for the supporting plate 43 and the bar 46 to rotate as a result of vibration forces. In most installations, however, the latter structural provision has been found unnecessary as the mere frictional engagement between the diaphragm 19 and plate 43 has sufficed to preclude such relative movement of the members.

The adjustable connection of the bar 46 to the motor frame plate 42 includes a sleeve nut 51 which is internally bored and threaded as at 52 for reception of the upper end of the bar 46 which is threaded for that purpose. The threaded exterior 53 of the sleeve nut 51 is received in an axial threaded hole in the frame plate 42. The threads 52 and 53, respectively, on the interior and exterior of the sleeve nut 51, are of the same hand but of slightly different pitch. Thus, upon turning of the nut 51, the bar 46 can be moved axially by slight increments any precisely desired distance. A locking screw 54 passing through the head 55 of the sleeve nut 51 eccentrically thereof is adapted to enter holes 56 provided in the frame plate 42 to prevent accidental rotation of the sleeve nut 51 and consequent axial displacement of the bar 46 and the diaphragm supporting plate 43. By means of the above adjustment arrangement, the supporting plate 43 may be moved to a position wherein no deformation of the diaphragm 19 is incurred, and this position maintained by utilization of the locking screw 54.

Since the diaphragm 19 is supported from the frame 42 of the motor or drive mechanism, the internal arrangement of the pump or driven device is not affected by the incorporation of the described support arrangement. Furthermore, installation and servicing of the construction are facilitated by the present arrangement since the pump need not be disassembled and the support plate need not be welded to the diaphragm.

The present invention is, accordingly, applicable to a wide variety of pumping installations and may be easily incorporated in other fluid handling devices than the particular deep-well pump described by way of example.

While I have described a particular embodiment of my invention, it will be understood that many modifications and/or variations may be made without departing from the spirit of the invention as expressed by the appended claims to which reference is directed.

I claim:

1. Power transmission arrangement for a fluid handling device comprising a chamber subject to fluid pressure, a diaphragm sealingly secured at an end of said chamber, a rotatable element within said chamber, a shaft rotatably supported without said chamber in axial alignment with said rotatable element, cooperating magnetic means adjacent said diaphragm on said rotatable element and said shaft in ring-like disposition thereabout for transmitting torque from one to the other, and means wholly without said chamber operative to support said diaphragm against fluid pressures developed within said chamber, said means including a member rigidly engaging substantially the entire central section of said diaphragm within the ring defined by said magnetic means.

2. A power transmission arrangement for a fluid hanling device having a fluid-containing housing provided with a diaphragmatic wall comprising a rotatable element within said housing, a shaft rotatably supported without said housing in axial alignment with said rotatable element, cooperating magnetic means adjacent said diaphragmatic wall on said rotatable element and said shaft in ring-like disposition thereabout for transmitting torque from one to the other, and means wholly without said housing connecting the diaphragmatic wall with the housing to immobilize said wall against fluid pressures developed within the housing, said means engaging substantially the entire central section of said diaphragmatic wall within the ring defined by said magnetic means.

3. A power transmission arrangement for a fluid handling device having a fluid-containing housing provided with a diaphragmatic wall comprising a first rotatable element within said housing, first magnetic means mounted on said first element and positioned immediately inside said diaphragmatic wall for movement in a predetermined path, a second rotatable element without said housing, and a second magnetic means mounted on said second rotatable element and positioned immediately outside said diaphragmatic wall for movement in a predetermined path aligned with that of said first magnetic means, said diaphragmatic wall having a continuous recess in one of its faces coinciding with the predetermined path of one of said magnetic means to enable said first and second magnetic means to be disposed extremely close to each other.

4. A power transmission arrangement for a fluid handling device having a fluid-containing housing provided with a diaphragmatic wall comprising a first rotatable element within said housing, a group of circumferentially disposed magnets mounted on said first element and positioned immediately inside said diaphragmatic wall, a second rotatable element without said housing rotatably supported in axial alignment with said first rotatable element, and a group of circumferentially disposed magnets mounted on said second rotatable element and positioned immediately outside said diaphragmatic wall in alignment with the magnets on said first rotatable element, said diaphragmatic wall having an annular recess in one of its faces to receive one of said groups of magnets to enable said groups of magnets to be disposed extremely close to each other.

5. A power transmission arrangement for a fluid handling device having a fluid-containing housing provided with an opening comprising a rotatable element within said housing, a group of circumferentially disposed magnets mounted on said element and positioned immediately inside said opening, a hollow shaft without said housing, means rotatably supporting said shaft in axial alignment with said rotatable element, a group of circumferentially disposed magnets mounted on said shaft and positioned immediately outside said opening in alignment with the magnets on said element, and a diaphragm disposed between said groups of magnets and in sealing relation to the opening in said housing, the inner face of said diaphragm having an annular recess therein to receive the group of magnets on said rotatable element to enable said groups of magnets to be disposed extremely close to each other.

6. A power transmission arrangement for a fluid handling device having a fluid-containing housing provided with a diaphragmatic wall comprising a rotatable element within said housing, a hollow shaft without said housing, means rotatably supporting said shaft in axial alignment with said rotatable element, cooperating magnetic means on said rotatable element and said shaft adjacent said diaphragmatic wall for transmitting torque from one to the other, a support member contacting said diaphragmatic wall within the path of the magnetic means on said hollow shaft, and adjustable means including a bar extending through said hollow shaft and spaced therefrom engaging said support member to hold the same against axial displacement due to fluid pressures within said housing.

7. A power transmission arrangement for a fluid handling device having a fluid-containing housing provided with an opening comprising a rotatable element within said housing, a group of circumferentially disposed magnets mounted on said element and positioned immediately inside said opening, a hollow shaft without said housing, means rotatably supporting said shaft in axial alignment with said rotatable element, a group of circumferentially disposed magnets mounted on said shaft and positioned immediately outside said opening in alignment with the magnets on said element, a diaphragm disposed between said groups of magnets and in sealing relation to the opening in said housing, a support member contacting substantially the entire outer surface of said diaphragm within the circumferential group of magnets on said shaft, and adjustable means including a bar extending through said hollow shaft and spaced therefrom engaging said support member to hold the same against axial displacement due to fluid pressures within said housing.

8. A power transmission arrangement for a fluid handling device having a fluid-receiving housing provided with an opening comprising a rotatable element within said housing, a group of circumferentially disposed magnets securely mounted on said elements and positioned immediately inside said opening, a hollow shaft without said housing, means rotatably supporting said shaft in axial alignment with said rotatable element, a group of circumferentially disposed magnets securely mounted on said shaft and positioned immediately outside said opening in alignment with the magnets on said element, a diaphragm disposed between said groups of magnets and in sealing relation to the opening in said housing, the inner face of said diaphragm having an annular recess therein to receive the group of magnets on said rotatable element, a support member positioned within the circumferential group of magnets on said hollow shaft and conforming to substantially the entire outer surface of said diaphragm within the circumferential group of magnets on said shaft, and means including a bar extending through said hollow shaft and spaced therefrom engaging said support member to hold the same and said diaphragm against axial displacement due to fluid pressures within said housing.

References Cited in the file of this patent

UNITED STATES PATENTS

| 1,954,014 | Lipman | Apr. 10, 1934 |
| 2,353,740 | Malone | July 18, 1944 |
| 2,399,856 | Coger | May 7, 1946 |
| 2,481,172 | Staggs | Sept. 6, 1949 |
| 2,541,906 | Anderson | Feb. 13, 1951 |
| 2,566,743 | Okulitch | Sept. 4, 1951 |